United States Patent [19]

Minahan

[11] Patent Number: 4,829,269
[45] Date of Patent: May 9, 1989

[54] HARMONIC PLASMA SWITCH

[75] Inventor: Joseph A. Minahan, Simi Valley, Calif.

[73] Assignee: Spectrolab, Inc., Sylmar, Calif.

[21] Appl. No.: 97,992

[22] Filed: Sep. 17, 1987

[51] Int. Cl.$^4$ .......................... G02F 1/36; G02B 5/23; H01S 3/101

[52] U.S. Cl. .................................. 332/7.51; 350/354; 350/312

[58] Field of Search ............... 350/267, 354, 311, 312; 332/7.51; 362/318; 358/253; 356/437

[56] References Cited

U.S. PATENT DOCUMENTS

| | | | |
|---|---|---|---|
| 3,620,597 | 11/1974 | Schwartz et al. | 350/354 |
| 4,003,631 | 1/1977 | Biet et al. | 350/359 |
| 4,190,811 | 2/1980 | Alcock et al. | 350/354 |
| 4,314,743 | 2/1982 | Rast | 350/354 |
| 4,549,788 | 10/1985 | Chemla | 350/363 |
| 4,626,075 | 12/1986 | Chemla | 350/354 |

OTHER PUBLICATIONS

Staupendahl et al., "Optical Tuning... Parameters", Wiss. Z. Fried.-Schi-Univ., Matts. Natur., vol. 32, #1, pp. 159-170, 1983 Abst.
Nurnikko, et al., "Ultrafast Optical... Materials", Plenum, N.Y., pp. 431-435, 1979, abst. only.

Primary Examiner—Nelson Moskowitz
Attorney, Agent, or Firm—W. J. Streeter; A. W. Karambelas

[57] ABSTRACT

A system for protecting a radiation-responsive device, such as an infrared sensor in an imaging system includes a plasma switch operative in response to amplitude of incident radiation. The protection system is suitable for protecting the infrared sensor from a high-intensity laser beam which might impinge upon receiving optics of the imaging system. The plasma switching responds differently to different portions of the electromagnetic spectrum, a lower frequency portion being either transparent or reflective of the infrared radiation, while an upper frequency portion absorbs radiation to initiate a high or low density of free-charge carriers in the plasma dependent on the intensity of photons injected into the plasma in the higher frequency band. Incoming infrared radiation is passed through a nonlinear crystal which serves as a harmonic generator for generating a harmonic component of the fundamental frequency, the fundamental frequency being below the plasma frequency and the harmonic component being above the plasma frequency. Thereby, photons injected at the harmonic frequency are absorbed into the plasma to raise the free-charge carrier density sufficiently to convert the plasma switch into a reflector of the fundamental component of the radiation under conditions of excessively high incident radiation.

9 Claims, 1 Drawing Sheet

HARMONIC PLASMA SWITCH

BACKGROUND OF THE INVENTION

This invention relates to a plasma switch for protecting a radiation-responsive device, such as an infrared sensor from excessively intense laser beams and, more particularly, to the use of a nonlinear crystal for obtaining a harmonic component of incident radiation, the harmonic component lying in an absorptive spectral region of the switch for inducing sufficient plasma density to reflect excessively intense radiation at the fundamental component of the incident radiation.

Radiation sensors and other devices are employed for communication and other purposes with coherent radiation, particularly lasers. Of particular interest, herein, is the transmission and reception of infrared radiation over a predetermined spectral band, such as infrared radiation having wavelengths in the range of 7-12 microns. Generally, at a receiving site such radiation is of a sufficiently low intensity to permit the use of optical focusing elements for directing incoming radiation to a sensor of the radiation. For example, such radiation may be emitted by subject matter in the form of a scene which is to be viewed by an array of radiation sensors or detectors to form an image of the scene. Alternatively, a sensor might be employed to receive data communicated optically from a distant source via a laser beam.

A characteristic of infrared radiation sensors is their operation at low temperatures with incident infrared radiation of relatively low intensity. Infrared radiation sensors are sensitive to temperature. If a beam of radiation incident upon the sensor were sufficiently intense to as to heat the sensor, such heating may well raise the temperature sufficiently to introduce catastrophic failure of the sensor. In low level radiation, the incident radiation does not produce any substantial temperature rise which might interfere with the proper operation of the sensor.

In the use of optical systems employing radiation-responsive devices which might be damaged by excessively intense radiation, there is the inherent danger that an unwanted source of radiation, such as a strong laser, may direct a beam of the radiation towards the receiving optics of the sensor system. Such a situation might arise by an accidental direction of a strong laser towards the sensor system, or might arise from a deliberate attempt as in warfare to damage the sensor.

Thus, there is a problem in that infrared sensors and similar radiation-responsive devices require protection from excessively intense beams of laser radiation. One attempt at solving this problem has been the employment of mechanical shutters which, in response to the detection of excessively intense incident radiation, are activated to close off a path of propagation of the radiation to the sensor, thereby to protect the sensor from the intense radiation. Such mechanical shutters suffer a disadvantage in that the response time for moving the shutter into the radiation path may well be excessively long. As a result, the sensor may suffer severe damage before the incident radiation has been fully blocked from the sensor by the shutter.

SUMMARY OF THE INVENTION

The foregoing problem is overcome and other advantages are provided by an optical system which couples incident radiation to a sensor of the radiation, the optical system including an optically activated switch in accordance with the invention. The switch is constructed of semiconductor material which can sustain a plasma of free charge carriers which determine the optical properties of the semiconductor material. With a plasma density below a critical value, the material is transparent to radiation having a wavelength longer than the plasma wavelength. When the plasma density is increased above the critical value, the plasma becomes a reflector of the incident radiation and, thereby, prevents the radiation from reaching the sensor.

In accordance with a feature of the invention, the plasma switch is activated in accordance with the intensity of the incident radiation. This is accomplished by obtaining a harmonic component of the incident radiation frequency, the harmonic component lying within an absorptive band of the plasma, at a frequency above the plasma frequency. In the case of incident infrared radiation at a nominal wavelength of 10 microns, nonlinear crystalline materials such as cadmium selenide and cadmium sulfide interact with infrared radiation to produce the second harmonic component, the efficiency of production of the component being proportional to the intensity of the radiation. Therefore, at relatively low levels of radiation, there is a negligible amount of the harmonic component, this resulting in a transparent condition in the plasma switch. At excessively high levels of radiation, a significant amount of the second harmonic component is produced, this resulting in—an infusion of photons in the absorptive frequency band of the plasma to elevate the plasma density above the critical density. Therefore, under conditions of excessively intense radiation, the optical state of the switch is changed to that of a reflector to reflect the radiation away from the sensor. Upon a reduction of the radiation intensity back to a low level, the transparent state of the switch is resumed to allow the radiation to propagate through the switch to the sensor. The switching of optical states of the plasma switch can be accomplished far more rapidly than the switching of a mechanical shutter, thereby providing more reliable protection of the sensor from intense radiation than has been possible heretofore.

BRIEF DESCRIPTION OF THE DRAWING

The aforementioned aspects and other features of the invention are explained in the following description, taken in connection with the accompanying drawing wherein.

DETAILED DESCRIPTION

Figure 1:
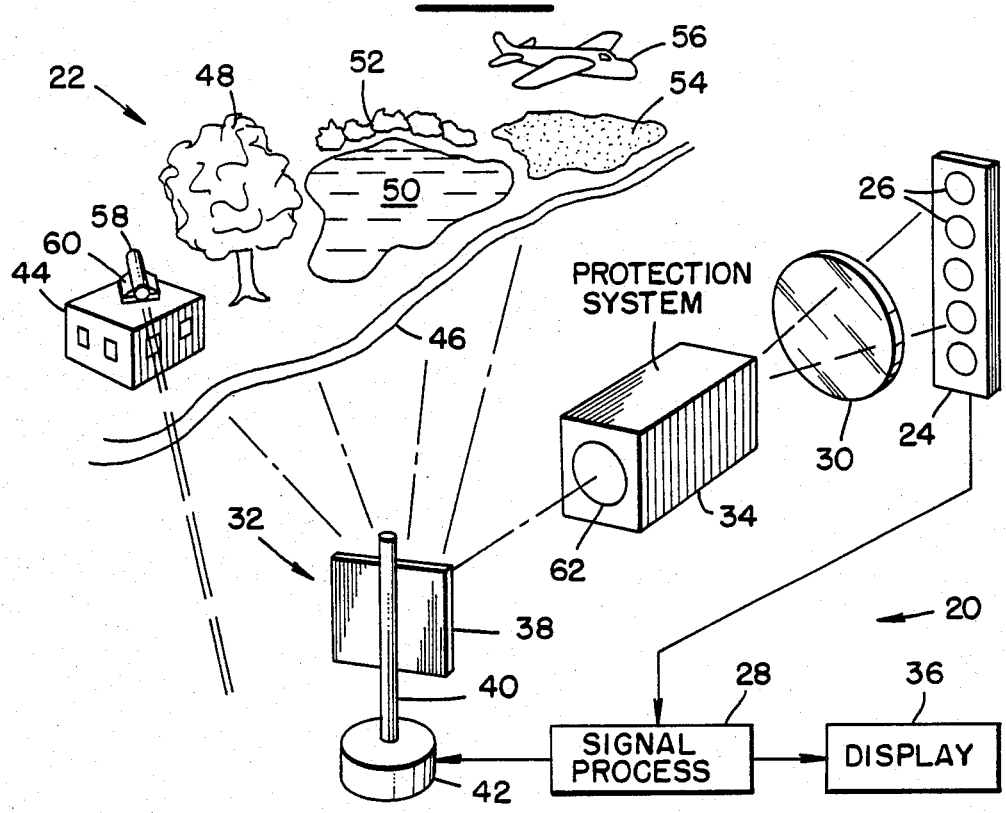
FIG. 1 is a stylized view of an infrared imaging system incorporating a protective coupling system of the invention.

FIG. 1 shows an imaging system 20 which incorporates the invention to form an image of scene 22. By way of example in demonstrating the use of the invention, the system 20 is responsive to infrared radiation emanating from the scene 22, it being understood that the invention may be employed with other forms of radiation including, but not limited to, radiation of the visible portion of the electromagnetic spectrum.

The imaging system 20 comprises an array 24 of infrared sensors 26, a processor 28 of signals outputted by the sensors 26 in response to their detection of infrared radiation, a lens 30 for focusing incident radiation from the scene 22, a scanner 32 for scanning the scene 22, and a protection system 34 operative in accordance with the invention for coupling only low-intensity radiation from the scanner 32 to the sensors 26 and reflecting high-intensity radiation away from the sensors 26. A display 36 presents an image of the scene 22, which image is produced by the signal processor 28. The scanner 32 comprises a mirror 38 pivotally mounted about a shaft 40 and connecting with a driver 42 which repetitively pivots the mirror 38 for directing radiation from various portions of the scene via the protection system 34 to the sensors 26 during each of a succession of scans of the scene 22. The processor 28 applies signals to the driver 42 for synchronizing operation of the scanner 32 with the signal processing.

A scene to be imaged by the system 20 may comprise a variety of subject matter in terms of intensity of radiation emitted by various portions of the scene. Accordingly, the scene 22 is shown, by way of example, as comprising a stone building 44 situated on the side of a road 46 with a tree 48 alongside the building 44. Also included in the scene 22 is a pond 50 of water bordered on one side by grass and bushes 52, and on another side by a region of sand 54. An aircraft 56 is shown above the sand 54. The foregoing components of the scene 22 are known to provide differing intensities of infrared radiation, particularly during illumination by the sun, some of the subject matter of the scene 22 being referred to as cool subjects while others are referred to as hot subjects. All of the foregoing subject matter of the scene 22 emits infrared radiation of a relatively low intensity suitable for detection by each of the sensors 26 for production of an image of the scene 22.

Also included within the scene 22 is a laser 58 shown mounted on a roof of the building 44 by a carriage 60 which can orient the laser 58 in a desired direction. By way of example, the laser 58 may be employed as part of a communication system. The laser 58 generates a high-intensity beam of electromagnetic radiation which, if directed towards the scanner 32, could cause catastrophic failure of the sensors 26 in the absence of the protection system 34. Even in the case wherein the frequency of the laser beam falls directly in the passband of radiation to be received by the system 20, the protection system 34 prevents the beam from reaching the sensors 26 while allowing the system 20 to undergo normal imaging operation in the absence of the laser beam.

Figure 2:
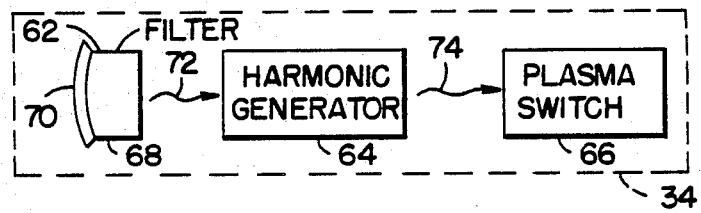
FIG. 2 is a block diagram showing components of the protective coupling system with waves of radiation indicated for a situation of low radiation intensity.
Figure 3:
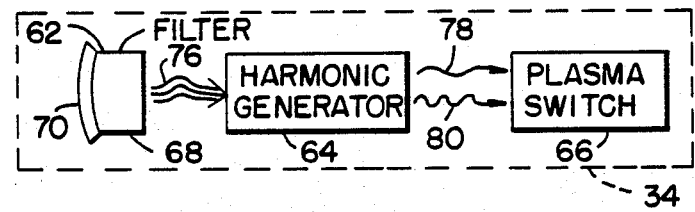
FIG. 3 is a block diagram showing components of the protective coupling system with waves indicating operation of the system under a situation of high radiation intensity.

With reference to FIGS. 2 and 3, the protection system 34 comprises a filter 62, a harmonic generator 64, and a plasma switch 66. The filter 62 comprises a lens 68 of radiation transmissive material with an optical coating 70 on a front surface thereof.

In operation, the filter 62 operates as a window to radiation in the band of interest which, in the case of the preferred embodiment of the invention, is infrared radiation in a range of 7-12 microns. Outside of the foregoing passband, the filter 62 blocks incident radiation, including even the high-instensity beam of the laser 58. Laser radiation, such as that of a carbon dioxide laser, lies within the foregoing passband and would propagate through the filter 62. The material of the lens 68 and of the coating 70 may be well-known ceramic materials customarily employed in the construction of infrared windows. The combination of the coating 70 with the material of the lens 68 serves to reflect out-of-band radiation, and thereby prevent out-of-band radiation, including high-intensity radiation of a laser such as the laser 58, from reaching the sensors 26. In the event that the radiation of the laser 58 lies within the passband of the filter 62, then the protection system 34 becomes activated to protect the sensors 26.

The harmonic generator 64 comprises crystalline material such as cadmium selenide, cadmium sulfide, cadmium telluride, zinc selenide and zinc sulfide, which materials are transparent to infrared radiation in the spectral region of interest, and operate in a nonlinear fashion to convert a portion of the electronmagnetic energy to a second harmonic component at double the frequency of the incident radiation. The percentage of second harmonic component produced by the generator 64 is dependent on the intensity of the incident radiation, the efficiency of the second harmonic generation being proportional to the input beam intensity. By way of example, in the case of an input laser pulse with wavelength of ten microns, the generator 64 outputs both the fundamental component at ten microns and the double frequency component with wavelength of five microns. In the low-intensity situation, as depicted in FIG. 2, the second harmonic component is essentially absent, in which case the input wave 72 of radiation and the output wave 74 of radiation are essentially the same. In the high-intensity situation depicted in FIG. 3, an input wave 76 at the fundamental frequency is converted into a first output wave 78 at the fundamental frequency and a second output wave 80 at the harmonic frequency.

Figure 4:
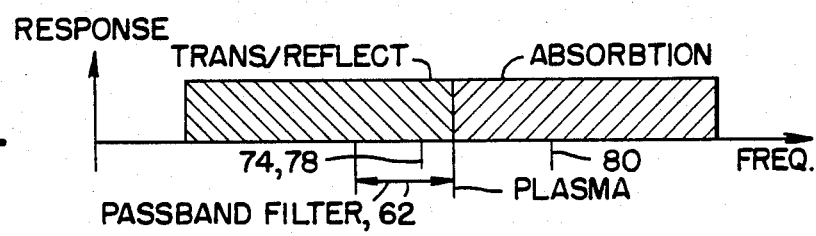
FIG. 4 is a simplified view of the spectral response of a plasma switch of FIGS. 2 and 3.

As shown in FIG. 4, the plasma switch 66 of FIGS. 2 and 3 absorbs photons in a frequency range above the plasma frequency. The output wve 80 of the harmonic component is in the absorption band. The passband of the filter 62, including the output waves 74 and 78 at the fundamental component are of lower frequency than the plasma frequency and lie within a transmission region of the plasma switch 66. The transmission region can be converted to a reflective region by injection of sufficient photons via the wave 80 to increase the density of free charge carriers in the plasma above a critical density at which point the optical characteristic of the plasma changes from one of transmission to one of reflection. Thus, the generator 64 drives the switch 66. The presence of the output wave 80 serves to control the optical characteristics of the switch 66 in the spectral region below the plasma frequency. A strong output wave 80 induces the reflective characteristic while a weak output wave 80 retains the transmissive characteristic of the switch 66. Since the intensity of the wave 80 is dependent on the intensity of radiation incident upon the imaging system 20, the plasma switch 66 is automatically and rapidly switched between the states of transmission and reflection of radiation within the passband of the filter 62, thereby to protect the sensors 26 from high-intensity radiation while allowing the sensors 26 to view low-intensity radiation for imaging a scene.

With respect to the optical properties of plasmas, it is noted that a free electron plasma can exist in a gas, in a metal, or in an insulator/semiconductor material. The free electron density in metals is so high that the longest plasma wavelength occurs in the ultraviolet region of the spectrum for the alkali metals, and at even shorter wavelengths for other metals. The free electron density of a gas plasma can be modulated by an electric field while the corresponding electron density in a semiconductor can be modulated electrically, thermally (as with an extrinsic semiconductor), or photonically (which may be either intrinsic or extrinsic modulation). In the preferred embodiment of the invention, the plasma modulation technique which appears to be most suitable for injection and modulation of the free electron density employs photon injection because the photon injection can be operated in combination with the harmonic generator 64 to allow the protection system 34 to readily and rapidly discriminate between high and low intensities of incident radiation signals.

The plasma switch 66, which may also be characterized as an optical switch or an optical shutter, can be further understood with reference to the following mathematical description of the plasma frequency for a dielectric medium with a number N of free charge carriers per unit volume. The mathematical relationship is given by $$p = \frac{4\pi N e^2}{m^* \epsilon} \quad (1)$$

or $$N_c = \frac{\omega_p^2 m^* \epsilon}{4\pi e^2} = \frac{\pi c^2 m^* \epsilon}{e^2 \lambda_p^2} \quad (2)$$

where
  e=electronic charge (esu) m*=electron effective mass
  $\epsilon$=static dielectric constant for the medium
  $\lambda_p$=plasma wavelength ($2\pi$=c/$\omega_p$)
  c=velocity of light in vacuum
  $N_c$=critical density for a given $\omega_p$ For the situation wherein the number N of free charge carriers per unit volume is greater than the critical density, all wavelengths of radiation greater than the plasma wavelength are reflected by the material of the switch 66. In the preferred embodiment of the invention, the switch material is a semiconductor. Therefore, if a sufficient density of free carriers can be injected into the semiconductor body of the switch 66, the semiconductor body will then become totally reflecting for all wavelengths greater than the plasma wavelength. With respect to the foregoing passband of 7–12 microns, the semiconductor material of the switch 66 should have a direct electron energy gap in the range of 0.16–0.23 electron volts in order to provide a high transparency to radiation at 10 microns wavelength while the being absorptive for wavelengths smaller than 7.5 microns.

The rise time of the second harmonic component and the resultant injection of free electrons in the switch 66 should be fast enough to insure that the free electron density at the plasma wavelength is reached before power in the fundamental component outputted by the generator 64 can demage the sensors 26. This is dependent on well-known absorption coefficient and recombination rate for the semiconductor material of the switch 66. By use of equation (2) for values of a plasma wavelength of 7 microns, an effective electron mass of 0.02, and a static dielectric constant of 15, there is obtained a critical density of 7 times $10^{18}$ carriers per cubic centimeter.

A suitable semiconductor material for the plasma switch 66 is indium antimonide which has a direct electron energy gap of 0.17 electron volts at a temperature of 300 degrees Kelvin, and an energy gap of 0.255 electron volts at 77 degrees Kelvin, an effective mass of 0.0133, a refractive index of 3.75, and a static dielectric constant of 18.

In operation, therefore, the scanner 32 scans incident infrared radiation emitted by subject matter of the scene 22 and directs the radiation via the protection system 34 and the lens 30 to the array 24 of the sensors 26. Radiation exiting the protection system 34 is focused by the lens 30 upon the sensors 26 such that each sensor 26 can detect radiation of a single line scan in the scanning pattern of the scanner 32. Signals detected by the sensors 26 are applied to the signal processor 28 for developing an image of the scene 22, the processor 28 driving the scanner 32 in synchronism with the signal processing operation of the processor 28. A resulting image produced by the processor 28 is presented on the display 36.

In accordance with the invention, the plasma switch 66 of the protection system 34 allows infrared radiation of a reltively low intensity to propagate from the scanner 32 to the sensors 26. However, in the event of excessively high incident radiation upon the scanner 32, as might be produced by the high-intensity laser beam of the laser 58, the optical characteristic of the plasma switch 66 is changed to that of a reflector for reflecting the high intensity radiation back towards the harmonic generator 64. Responsivity of the protection system 34 to intensity of incident radiation is provided by the harmonic generator 64 which, in the event of excessively high intensity radiation, outputs a harmonic component wave 80 within the absorptive frequency band of the switch 66 to increase the density of charge carriers in the plasma to provide the reflection characteristic of the plasma switch 66. Upon return of the radiation intensity to the low value, the intensity of the second harmonic output wave 80 drops to a negligibly small value so that the optical state of the plasma returns to a transmissive state for the radiation. The filter 62 is reflective to incident radiation lying outside of a desired passband, and permits entry only of radiation lying within the passband of the filter 62.

In view of the foregoing description, the invention protects an imaging system from high intensity radiation, whether such radiation be incident accidentally or deliberately upon input optics of the imaging system. By use of the harmonic generator 64 in combination with the plasma switch 55, and by selecting the passband of the filter 32 to be below the plasma frequency of the switch 66, the switch 66 becomes automatically activated by an out-of-band harmonic component of the in-band radiation, which harmonic component lies within an absorption region of the plasma. In view of the nonlinear action of the crystalline material of the generator 62, the harmonic component, in sufficient intensity to activate the switch 66, is attained only in the presence of excessively strong radiation incident upon the imaging system 20. Thereby, the switch 66 automatically alternates between states of transmission and reflection to radiation in the passband of the filter 62 to allow the sensors 26 to detect incoming radiation for imaging the scene 22. However, in the event of excessively intense radiation, the switch 66 reflects the intense radiation away from the sensors 26.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed is:

1. A system for coupling incident radiation to a radiation-responsive device, said system decoupling the radiation from the device under conditions of excessive intensity of the radiation so as to protect the device, the system comprising:

plasma means switchable between states of transmittance and nontransmittance to a portion of the spectrum of the incident radiation lying below a plasma frequency, said plasma means reflecting radiation in said nontransmittance state, said plasma means being excitable by photons at a frequency outside said passband, and said driver means being harmonically responsive to the radiation for providing photons at a harmonic of the radiation frequency, a harmonic component outputted by the driver means providing protons to the plasma means at a frequency outside the passband for initiating a state of nontransmittance of the plasma in response to excessive intensity of the incident radiation;

filter means for limiting the spectrum of radiation entering the plasma means to frequencies in a passband below the plasma frequency, said filter means being transparent to radiation within said passband and reflective of radiation at frequencies outside of said passband; and driver means for controlling a density of plasma in said plasma means, said driver means being activated by the intensity of the incident radiation for driving said plasma means to switch between the states of transmittance and nontransmittance.

2. A system for coupling incident radiation to a radiation-responsive device, according to claim 1, said device being an infrared sensor, wherein said filter comprises an infrared window transparent to radiation in said passband, said filter reflecting radiation having frequencies lying outside said passband.

3. A system according to claim 2 wherein said driver means comprises a nonlinear crystal producing a harmonic component at an efficiency which increases with increasing intensity of the incident radiation, thereby to reduce the plasma density of said plasma means for transmittance of radiation to said device at relatively low intensities of the incident radiation, and to increase the density of the plasma above the critical density for introduction of the plasma state of nontransmittance of the radiation to the device upon the occurrence of elevated intensities of the incident radiation.

4. A system according to claim 3 wherein the critical wavelength of the plasma is approximately 7.5 microns, a nominal value of wavelength for radiation within the passband is approximately 10 microns, said plasma means becomes a reflector or radiation within the passband during the nontransmittance state; and wherein said driver means comprises a crystal of nonlinear optical material having an electron energy bandgap in a range of approximately 0.16–0.23 electron volts.

5. A system according to claim 4 wherein the crystalline material of said driver means is a nonlinear material, propagative of infrared radiation, and consisting of cadmium selenide, cadmium sulfide, cadmium telluride, zinc selenide, or zinc sulfide.

6. A system according to claim 5 wherein the semiconductor material of said plasma means is indium antimonide.

7. A system according to claim 1 wherein said driver means comprises material transparent to the radiation but interacting nonlinearly with the radiation to produce a harmonic component of a frequency double the frequency of the radiation, said driver means applying photons at the frequency of the harmonic component to said plasma means for raising the density of the plasma above a critical density in response to an excessive intensity of the incident radiation, thereby to activate said plasma means to reflect radiation of excessive intensity in said passband away from said device.

8. A system according to claim 7 wherein the nonlinear material of said driver means produces said harmonic component with an efficiency which rises for rising intensities of said incident radiation, the intensity of said harmonic component being sufficiently small for relatively low values of incident radiation to reduce the plasma density below the critical density at relatively low values of incident radiation, the harmonic component becoming sufficiently intense at relatively high intensities of the incident radiation to raise the density of the plasma above the critical density at excessively high values of the incident radiation, thereby to protect the device from the incident radiation during high values of radiation intensity while exposing said device to the incident radiation during relatively low values of intensity of the radiation.

9. In a system for coupling incident radiation to a radiation-responsive device, said system decoupling the radiation from the device under conditions of excessive intensity of the radiation so as to protect the device, a method of protecting the device comprising the steps of:

limiting the spectrum of an input signal to a predesignated passband;

transmitting radiation within said passband via a plasma switch to said device;

adjusting the density of a plasma in said switch to produce alternate states of transparency and reflectance to radiation within said passband, a transparency of said switch providing for propagation of radiation to said device; a reflectance in said switch reflecting radiation away from said device, said step of adjusting being accomplished by injecting photons into said plasma switch;

extracting a harmonic component of radiation within said passband; said step of extracting being accomplished in a nonlinear fashion for efficient generation of the harmonic component only at relatively large values of intensity of radiation within the passband, there being relatively little generation in the harmonic component at relatively low value of the radiation on the passband; and applying the photons to said plasma switch at a frequency of the harmonic component, which frequency lies within a plasma absorption band above the plasma frequency and outside of said passband, thereby to protect said device from high intensity radiation while exposing said device to low intensity radiation.

* * * * *

UNITED STATES PATENT AND TRADEMARK OFFICE
CERTIFICATE OF CORRECTION

PATENT NO. : 4,829,269

DATED : May 9, 1989

INVENTOR(S) : JOSEPH A. MINAHAN

It is certified that error appears in the above-identified patent and that said Letters Patent is hereby corrected as shown below:

Column 4, line 39, delete "wve" and insert --wave--.

Column 8, line 12, Claim 7 delete "of" and insert --at--.

Signed and Sealed this

Eleventh Day of June, 1991

*Attest:*

*Attesting Officer*

HARRY F. MANBECK, JR.

*Commissioner of Patents and Trademarks*